(12) United States Patent
Kao et al.

(10) Patent No.: US 11,335,123 B2
(45) Date of Patent: May 17, 2022

(54) LIVE FACIAL RECOGNITION SYSTEM AND METHOD

(71) Applicant: Wistron Corporation, New Taipei (TW)

(72) Inventors: Chuan-Yen Kao, New Taipei (TW); Yao-Tsung Chang, New Taipei (TW); Chih-Yang Hung, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/781,722

(22) Filed: Feb. 4, 2020

(65) Prior Publication Data

US 2021/0174068 A1 Jun. 10, 2021

(30) Foreign Application Priority Data

Dec. 10, 2019 (TW) .................. 108145047

(51) Int. Cl.
*G06V 40/16* (2022.01)

(52) U.S. Cl.
CPC .......... *G06V 40/172* (2022.01); *G06V 40/165* (2022.01); *G06V 40/167* (2022.01); *G06V 40/169* (2022.01); *G06V 40/171* (2022.01)

(58) Field of Classification Search
CPC .......... G06K 9/00288; G06K 9/00281; G06K 9/00261; G06K 9/00275; G06K 9/00248; G06K 9/0012; G06K 2009/00932; G06K 9/0002; G06K 9/00026; G06K 9/00885; G06K 9/00892; G06K 9/00906; G06K 9/036; G06K 9/6215; G06K 2009/00939; G06K 9/00201; G06K 9/6288; G06K 9/629; G06K 9/00335; G06K 9/00355; G06K 9/00114; G06K 9/00228; G06K 9/00234; G06K 9/00302; G06K 9/00268; G06K 9/00362; G06K 9/3233; G06K 9/00107;

(Continued)

(56) References Cited

U.S. PATENT DOCUMENTS

2006/0102843 A1\* 5/2006 Bazakos ............ G06K 9/00255
250/339.05
2013/0251215 A1\* 9/2013 Coons ................ H04N 5/23219
382/118

(Continued)

FOREIGN PATENT DOCUMENTS

| CN | 103034846 A | 4/2013 |
|---|---|---|
| CN | 105740778 A | 7/2016 |
| CN | 108629305 A | 10/2018 |

OTHER PUBLICATIONS

Office Action dated Oct. 7, 2020 in corresponding Taiwan Patent Application No. 108145047.

(Continued)

*Primary Examiner* — Nimesh Patel
(74) *Attorney, Agent, or Firm* — Donald E. Stout; Stout, Uxa & Buyan, LLP

(57) ABSTRACT

A live facial recognition method includes projecting a given pattern to a subject under recognition; capturing a reflected pattern of the subject under recognition; and detecting whether the subject under recognition is a flat surface according to the reflected pattern. The subject under recognition is determined to be a living subject when the subject under recognition is not a flat surface.

16 Claims, 5 Drawing Sheets

(58) Field of Classification Search
CPC ........... G06K 9/00765; G06K 9/00771; G06K 9/00899; G06K 9/00046; G06K 9/0004; G06K 2209/01; G06K 9/00087; G06K 9/2036; G06K 9/209; G06K 9/22; G06K 9/46; G06F 16/9535; G06F 16/248; G06F 16/29; G06F 16/24578; G06F 16/337; G06F 16/48; G06F 21/32; G06F 8/30; G06F 3/017; G06F 1/3206; G06F 21/629; G06F 21/88; G06F 16/95; G06F 21/31; G06F 21/445; G06F 21/552; G06F 21/577; G06F 21/6218; G06F 2221/2101; G06F 2221/2115; G06F 2221/2119; G06T 7/0012; G06T 2207/10088; G06T 2207/30008; G06T 7/11; G06T 7/187; G06T 2207/10064; G06T 2207/20212; G06T 2207/30201; G06T 7/0014; G06T 7/136; G06T 2207/30076; G06T 2207/10016; G06T 7/75; G06T 2207/20216; G06T 2207/30088; G06T 7/0016; G06T 7/73; G06T 2207/20021; G06T 2207/20056; G06T 7/20; G06T 7/254; G06T 7/90; G06N 20/00; G06N 7/005; G06N 3/006; G06N 5/02; G06N 7/00; G06N 3/004; G06N 5/048; G01J 2005/0077; G01J 2005/0085; G01J 5/12; G01J 5/0025; G01S 7/415; G01S 13/66; G01S 13/867; G01S 7/41; G01S 13/56; G01S 13/86; G01S 13/888; G01S 13/931; G01S 13/02; G01S 15/06; G01S 15/10; G01S 15/89; G01S 19/17; G01S 5/02; G01S 2013/462; G01S 7/40; G01S 7/411; H04L 63/1483; H04L 63/1491; G02F 1/13338; G02F 1/133504; G02F 1/133606; G02F 1/133607; G02F 1/1335; G02B 6/00; G02B 6/0051; G02B 6/0055; G02B 6/0076

See application file for complete search history.

(56) References Cited

U.S. PATENT DOCUMENTS

| | | | |
|---|---|---|---|
| 2017/0086755 A1* | 3/2017 | De Haan | A61B 5/02405 |
| 2018/0239955 A1* | 8/2018 | Rodriguez | G06F 21/32 |
| 2019/0014999 A1* | 1/2019 | Yuen | G06K 9/00906 |
| 2019/0354746 A1* | 11/2019 | Zhang | G06K 9/00906 |
| 2020/0050833 A1* | 2/2020 | Ogasawara | G06K 9/4604 |
| 2020/0156648 A1* | 5/2020 | Zhang | G06K 9/00255 |

OTHER PUBLICATIONS

Office Action dated Dec. 1, 2021 in corresponding Taiwan Patent Application No. 108145047.

* cited by examiner

LIVE FACIAL RECOGNITION SYSTEM AND METHOD

CROSS-REFERENCE TO RELATED APPLICATIONS

This application claims priority to Taiwan Patent Application No. 108145047, filed on Dec. 10, 2019, the entire contents of which are herein expressly incorporated by reference.

BACKGROUND OF THE INVENTION

1. Field of the Invention

The present invention generally relates to facial recognition, and more particularly to a live facial recognition method and system.

2. Description of Related Art

Facial recognition is computer image processing capable of identifying facial features from a digital image or a video frame, and could be used as a security measure. Facial recognition is one of biometrics such as fingerprint or eye iris recognition. Facial recognition may be adapted to electronic devices such as computers, mobile phones and card readers. Particularly, as mobile devices are becoming more popular, the security measure is in high demand.

A conventional facial recognition system uses a two-dimensional (2D) camera to capture an image, from which facial features are extracted and compared with a database. However, the conventional facial recognition system usually cannot distinguish a real person from a picture while performing recognition, becoming a security loophole to be exploited.

In order to enhance reliability of the security measure, a facial recognition system is proposed to ask a user to act according to a given instruction such as swinging or rotating head, opening mouth or closing eyes. Further, some images may be captured while the user is acting on instruction, and accordingly depth information may be obtained and used to identify a real person. Nevertheless, those schemes take time and cause inconvenient.

A need has thus arisen to propose a novel facial recognition scheme capable of maintaining or enhancing reliability of the security measure, and accelerating facial recognition with convenience.

SUMMARY OF THE INVENTION

In view of the foregoing, it is an object of the embodiment of the present invention to provide a live facial recognition method and system capable of quickly recognizing a face accurately and conveniently.

According to one embodiment, a given pattern is projected to a subject under recognition; a reflected pattern of the subject under recognition is captured; and detection is made according to the reflected pattern to determine whether the subject under recognition is a flat surface. The subject under recognition is determined to be a living subject when the subject under recognition is not a flat surface.

DETAILED DESCRIPTION OF THE INVENTION

Figure 1A:
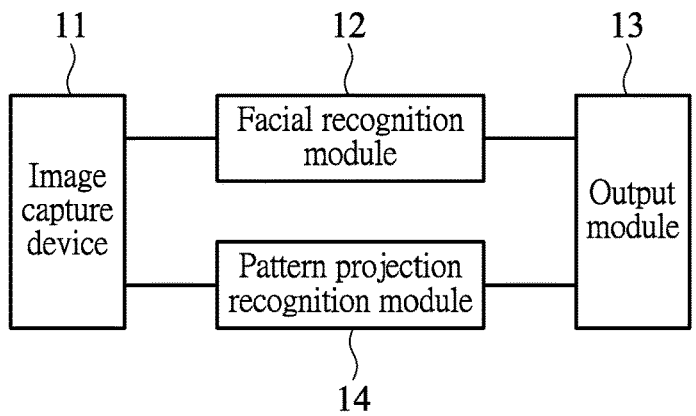
FIG. 1A shows a block diagram illustrating a live facial recognition system according to one embodiment of the present invention.
Figure 1B:
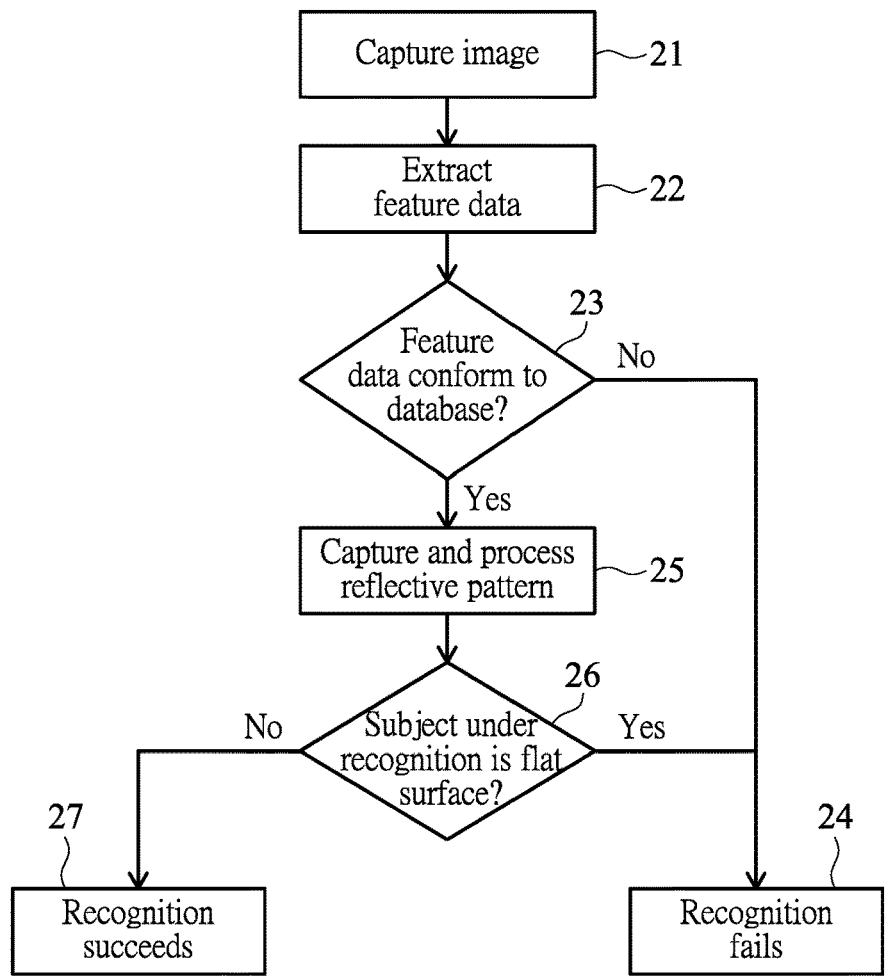
FIG. 1B shows a flow diagram illustrating a live facial recognition method according to one embodiment of the present invention.

FIG. 1A shows a block diagram illustrating a live facial recognition system 100 according to one embodiment of the present invention, and FIG. 1B shows a flow diagram illustrating a live facial recognition method 200 according to one embodiment of the present invention. The blocks of the live facial recognition system (system hereinafter) 100 and the steps of the live facial recognition method (method hereinafter) 200 may be implemented by hardware, software or their combination, for example, performed in a digital image processor.

In the embodiment, the system 100 may include an image capture device 11, such as a camera, configured to capture at least one image of a face of a subject under recognition (step 21) at a frame rate, for example, of 30 frames per second (FPS). The camera of the embodiment may be a two-dimensional (2D) camera or a three-dimensional (3D) camera (e.g., a 3D camera composed of two lenses or a 3D camera composed of a 2D camera and a depth detection device).

In the embodiment, the system 100 may include a facial recognition module 12 configured to extract at least one feature data (step 22) according to the image. In step 23, an output module 13 of the system 100 may compare the extracted feature data with a facial feature database (database hereinafter). If the extracted feature data does not conform to the database (i.e., difference therebetween is not less than a predetermined threshold, indicating that facial features therebetween are distinct), the output module 13 then determines that the recognition fails (step 24). If the extracted feature data conforms to the database, the flow of the method 200 then goes to step 25.

Figure 2A:
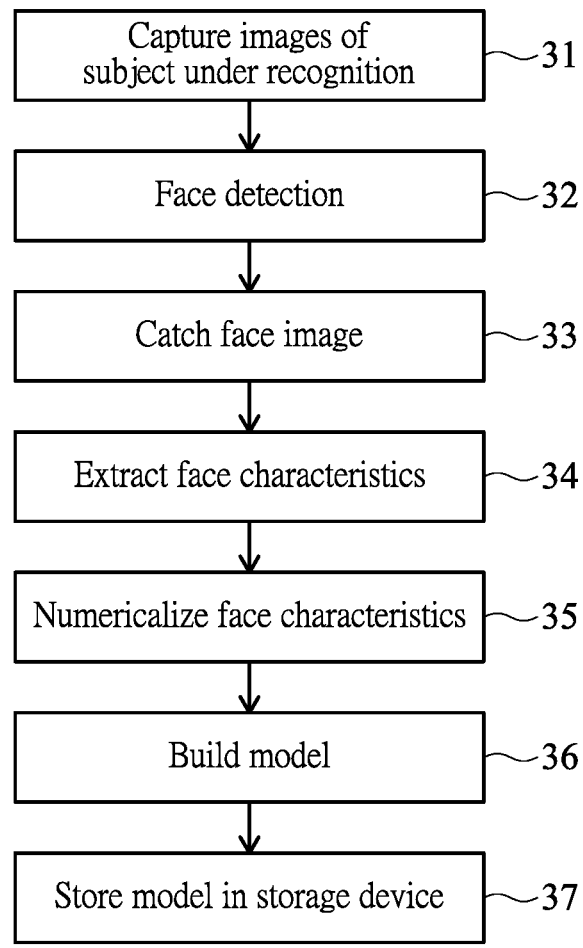
FIG. 2A shows a flow diagram illustrating a method of generating a database.
Figure 2B:
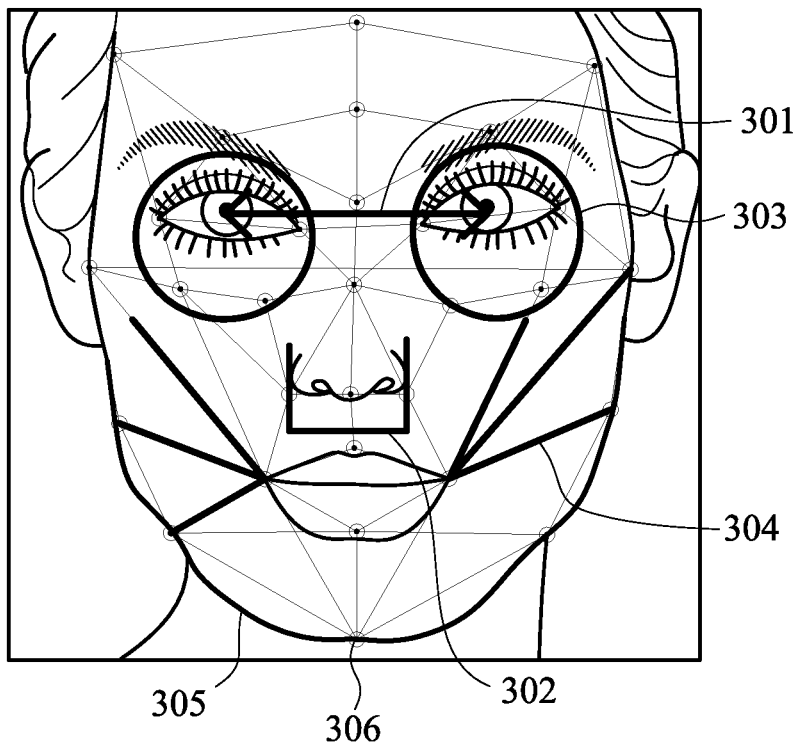
FIG. 2B shows exemplary face characteristics according to one embodiment of the present invention.

FIG. 2A shows a flow diagram illustrating a method 300 of generating a database. Specifically, in step 31, a camera may be used to capture an image of a subject under recognition. Next, in step 32, a processor may be used to perform face detection on the captured image. In step 33, a face image substantially covering a facial contour may be caught from the captured image according to results of the face detection. Subsequently, in step 34, the processor may extract or derive face characteristics from the face image. FIG. 2B shows exemplary face characteristics according to one embodiment of the present invention, including a distance 301 between eyes, a width 302 of a nose, depth 303 of an eye socket, a structure 304 of cheekbones, a length 305 of a jaw line and/or a chin point 306. In step 35, the processor may numericalize the face characteristics to generate facial feature values as feature data. Next, in step 36, a model is built according to the facial feature values, and a facial feature database is accordingly generated and stored in a storage device (step 37).

Figure 2C:
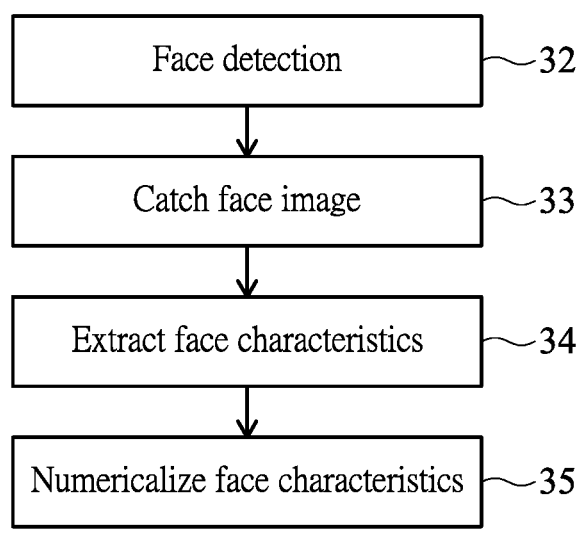
FIG. 2C shows a detailed flow diagram of step 22 in the method of FIG. 1B.

FIG. 2C shows a detailed flow diagram of step 22 in the method 200 of FIG. 1B. Extracting feature data of the face of the subject under recognition (step 22) is similar to steps 32-35 of FIG. 2A. Specifically, in step 32, the facial recognition module 12 may perform face detection on the captured image. In step 33, a face image substantially covering a facial contour may be caught from the captured image according to results of the face detection. Subsequently, in step 34, the facial recognition module 12 may extract or derive face characteristics from the face image. In step 35, the facial recognition module 12 may numericalize the face characteristics to generate facial feature values as feature data.

According to one aspect of the embodiment, the system 100 may include a pattern projection recognition module 14 configured to project a given pattern, and to capture and process a reflected pattern, according to which detection is made to determine whether the subject under recognition is a flat surface (step 25). In step 26, if the subject under recognition is determined to be a flat surface, indicating that the subject captured by the image capture device 11 may be a photo or a display screen (i.e., non-living subject), the output module 13 may determine that the recognition fails (step 24). If the subject under recognition is determined to be not a flat surface, the output module 13 may determine that the recognition succeeds (step 27).

Figure 3A:
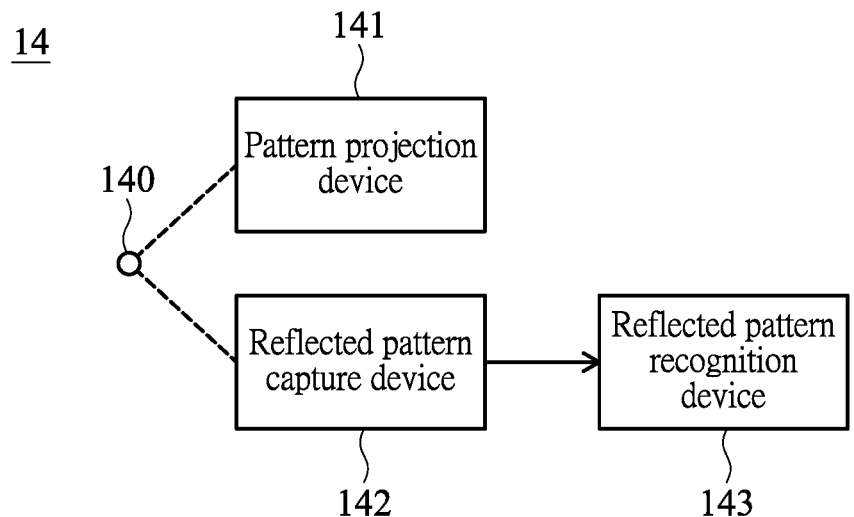
FIG. 3A shows a detailed block diagram of the pattern projection recognition module of FIG. 1A.
Figure 3B:
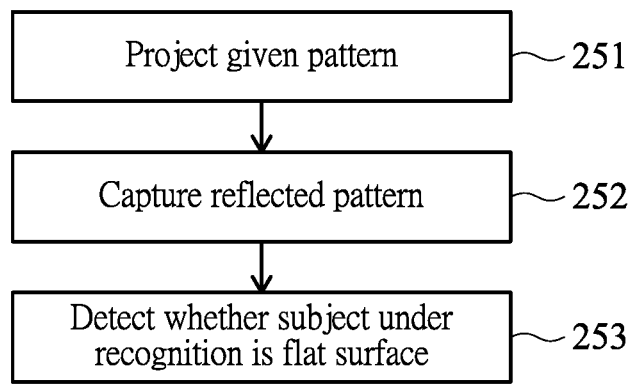
FIG. 3B shows a detailed flow diagram of step 25 of FIG. 1B.

FIG. 3A shows a detailed block diagram of the pattern projection recognition module 14 of FIG. 1A, and FIG. 3B shows a detailed flow diagram of step 25 of FIG. 1B. In the embodiment, the pattern projection recognition module 14 may include a pattern projection device 141 configured to project a given pattern to a face of a subject under recognition 140 (step 251). The pattern projection device 141 may include an optical projector for projecting a visible or invisible light (e.g., infrared light). In one embodiment, the projected light may be a laser light, whose pattern does not diverge over distances. In the embodiment, the projected pattern may include at least one smooth line such as straight line(s), rectangle(s) or circle(s).

In the embodiment, the pattern projection recognition module 14 may include a reflected pattern capture device 142 configured to capture a reflected pattern from the subject under recognition (step 252). The reflected pattern capture device 142 may include a sensor capable of receiving a visible or invisible light. In case of the visible light, the reflected pattern capture device 142 and the image capture device 11 may share the same sensor; in case of the invisible light, the reflected pattern capture device 142 (e.g., infrared sensor or camera) may be disposed near the image capture device 11.

In the embodiment, the pattern projection recognition module may include a reflected pattern recognition device 143 configured to detect whether the subject under recognition 140 is a flat surface (step 253) or a curved surface. If the subject under recognition 140 is a flat surface, indicating that the subject under recognition 140 may be a photo or a display screen (i.e., non-living subject), the smooth line of the projected pattern may remain smooth. If the subject under recognition 140 is a curved surface, indicating that the subject under recognition 140 may be a living subject, the smooth line of the projected pattern may become rough (e.g., zigzag line). For better recognition of the reflected pattern, a substantive distance should exist between the reflected pattern capture device 142 and the pattern projection device 141, and a substantive angle difference should exist between the pattern projection device 141 and the subject under recognition 140.

Figure 4:
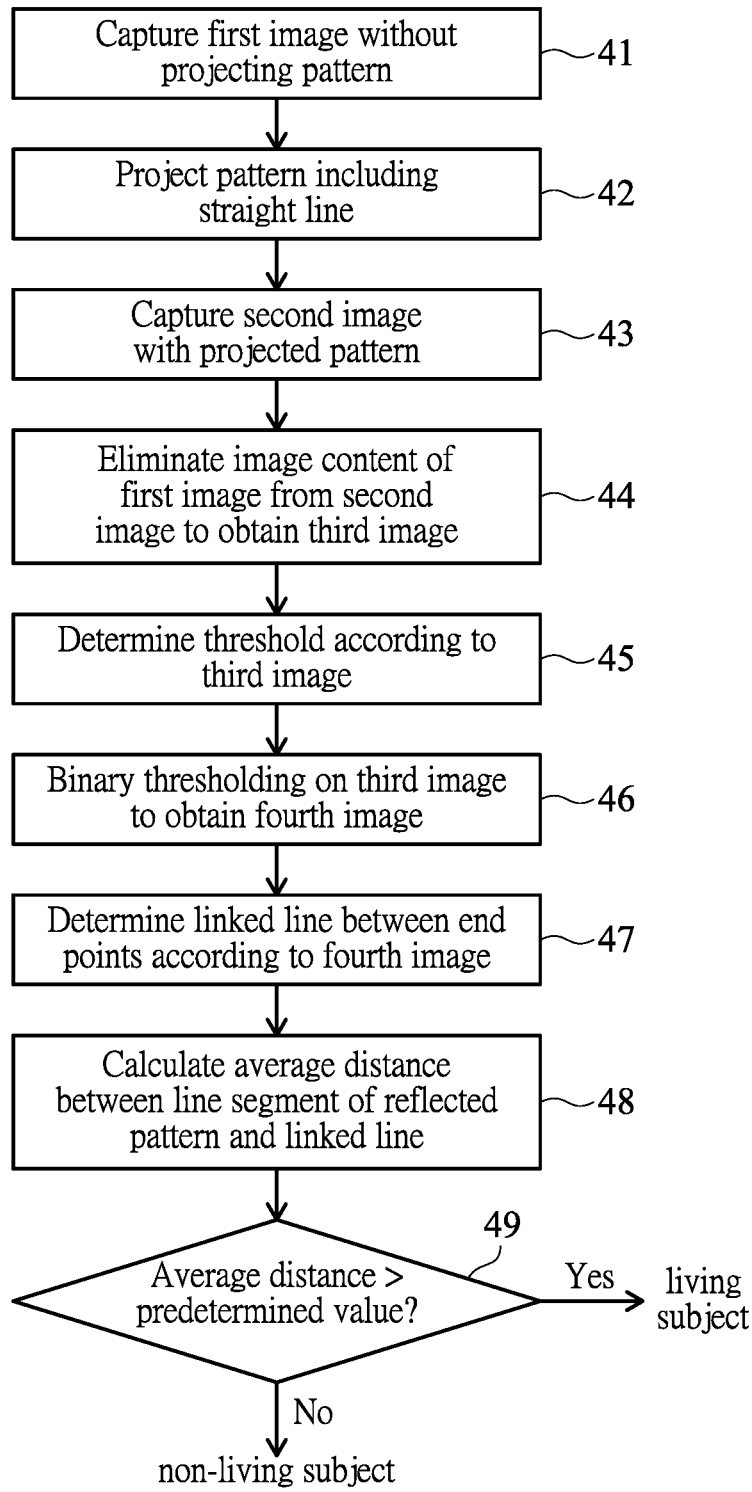
FIG. 4 shows a flow diagram illustrating a pattern projection recognition method according to one embodiment of the present invention.

FIG. 4 shows a flow diagram illustrating a pattern projection recognition method 400 according to one embodiment of the present invention. In step 41, the reflected pattern capture device 142 may capture a first image without projecting a pattern (by the pattern projection device 141). In step 42, the pattern projection device 141 may project a pattern including a straight line, and the reflected pattern capture device 142 may capture a second image with the projected pattern (step 43). It is noted that the face of the subject under recognition on the first image is the same as the second image. In another embodiment, a pattern with plural straight lines, a square, a rectangle or a circle may be projected instead. If the square, rectangle or circle is solid, edge detection technique may be further used to extract contour.

In step 44, the reflected pattern recognition device 143 may eliminate image content of the first image from the second image by using an image processing method to obtain a third image, which may include the reflected pattern but not the subject under recognition. In the embodiment, the projected pattern is visible. In another embodiment, the projected pattern is invisible (e.g., infrared), and steps 41 and 44 may be omitted.

In step 45, a threshold may be determined (by the reflected pattern recognition device 143) according to (e.g., energy distribution of) the third image. For example, arithmetic mean or median of the third image may be calculated to obtain the threshold. In step 46, binary thresholding may be performed (by the reflected pattern recognition device 143) on the third image to obtain a fourth image, for example, by comparing pixels of the third image with the threshold. Specifically, if a pixel value of the third image is greater than the threshold, a pixel value of a corresponding pixel of the fourth image is set an assertive value (e.g., "1"); otherwise a pixel value of a corresponding pixel of the fourth image is set a nonassertive value (e.g., "0").

Subsequently, in step 47, a line segment of the reflected pattern within the face of the subject under recognition may be determined (by the reflected pattern recognition device 143) according to the fourth image. A linked (straight) line between two end points of the line segment may be determined. If the projected pattern includes a circle, the reflected pattern may be an ellipse. In this case, major axis and minor axis of the ellipse may be determined instead. If the projected pattern includes a thick line, a center line of the thick line may be determined instead.

In step 48, an average distance between the line segment of the reflected pattern and the linked line along a plurality of points thereof may be calculated (by the reflected pattern recognition device 143). In the embodiment, a statistical mean (e.g., root mean square) of the distances (between the line segment and the linked line) may be calculated. In step 49, the reflected pattern recognition device 143 may determine whether the average distance (e.g., statistical mean) is larger than a predetermined value. If the determination is positive, the subject under recognition is determined to be a living subject; otherwise the subject under recognition is determined to be a non-living subject. Furthermore, curvatures of a plurality of areas (e.g., front-nose area and side-nose area) of the face of the subject under recognition may be detected, followed by determining whether the curvatures conform to a normal criterion (e.g., front-nose area has a curvature larger than side-nose area). If the determination is positive, the subject under recognition is determined to be a living subject; otherwise the subject under recognition is determined to be a non-living subject.

Although specific embodiments have been illustrated and described, it will be appreciated by those skilled in the art that various modifications may be made without departing from the scope of the present invention, which is intended to be limited solely by the appended claims.

What is claimed is:

1. A live facial recognition method, comprising:
   (a) projecting a given pattern that comprises at least one smooth line to a subject under recognition;
   (b) capturing a reflected pattern of the subject under recognition; and
   (c) detecting whether the subject under recognition is a flat surface according to the reflected pattern by determining two end points of the reflected pattern within a face of the subject under recognition, and forming a linked line between the two end points, calculating an average distance between the reflected pattern and the linked line along a plurality of points thereof, and determining whether the average distance is greater than a predetermined value;
   wherein the subject under recognition is determined to be a living subject when the subject under recognition is not a flat surface.

2. The method of claim 1, wherein the given pattern comprises at least one straight line.

3. The method of claim 2, wherein the step (b) comprises:
   capturing a first image without projecting the given pattern; and
   capturing a second image with the projected pattern.

4. The method of claim 3, wherein the step (c) further comprises:
   eliminating image content of the first image from the second image by using an image processing method to obtain a third image; and
   performing binary thresholding on the third image to obtain a fourth image.

5. The method of claim 4, wherein the step (c) further comprises:
   determining a threshold according to energy distribution of the third image, according to which the binary thresholding is performed on the third image.

6. The method of claim 4, wherein the average distance is a statistical mean between distances between the reflected pattern and the linked line along the plurality of points thereof.

7. The method of claim 4, wherein the step (c) further comprises:
   detecting curvatures of a plurality of areas of the face of the subject under recognition; and
   comparing the curvatures of the areas.

8. The method of claim 1, before the step (a), further comprising:
   capturing at least one image of a face of the subject under recognition;
   extracting at least one feature data according to the at least one image; and
   comparing the feature data with a facial feature database.

9. A live facial recognition system, comprising:
   a pattern projection device that projects a given pattern that comprises at least one smooth line to a subject under recognition;
   a reflected pattern capture device that captures a reflected pattern of the subject under recognition; and
   a reflected pattern recognition device that detects whether the subject under recognition is a flat surface according to the reflected pattern by determining two end points of the reflected pattern within a face of the subject under recognition, and forming a linked line between the two end points, calculating an average distance between the reflected pattern and the linked line along a plurality of points thereof, and determining whether the average distance is greater than a predetermined value;
   wherein the subject under recognition is determined to be a living subject when the subject under recognition is not a flat surface.

10. The system of claim 9, wherein the given pattern comprises at least one straight line.

11. The system of claim 10, wherein the reflected pattern capture device performs the following steps:
    capturing a first image without projecting the given pattern; and
    capturing a second image with the projected pattern.

12. The system of claim 11, wherein the reflected pattern recognition device performs the following steps:
    eliminating image content of the first image from the second image by using an image processing method to obtain a third image; and
    performing binary thresholding on the third image to obtain a fourth image.

13. The system of claim 12, wherein the reflected pattern recognition device further performs the following steps:
    determining a threshold according to energy distribution of the third image, according to which the binary thresholding is performed on the third image.

14. The system of claim 12, wherein the average distance is a statistical mean between distances between the reflected pattern and the linked line along the plurality of points thereof.

15. The system of claim 12, wherein the reflected pattern recognition device further performs the following steps:
    detecting curvatures of a plurality of areas of the face of the subject under recognition; and
    comparing the curvatures of the areas.

16. The system of claim 9, further comprising:
    a facial recognition module that receives at least one image of a face of the subject under recognition, extracts at least one feature data according to the at least one image, and compares the feature data with a facial feature database.

* * * * *